United States Patent
Khan et al.

(10) Patent No.: US 7,865,153 B2
(45) Date of Patent: Jan. 4, 2011

(54) APPARATUS AND METHOD FOR TRANSMIT DIVERSITY AND BEAMFORMING IN A WIRELESS NETWORK

(75) Inventors: Farooq Khan, Allen, TX (US); Cornelius van Rensburg, Dallas, TX (US); Jiann-An Tsai, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 702 days.

(21) Appl. No.: 11/779,052

(22) Filed: Jul. 17, 2007

(65) Prior Publication Data
US 2008/0039030 A1 Feb. 14, 2008

Related U.S. Application Data

(60) Provisional application No. 60/837,101, filed on Aug. 11, 2006.

(51) Int. Cl.
*H04B 7/02* (2006.01)
(52) U.S. Cl. .................. 455/101; 455/114.2; 455/273; 455/279.1; 455/226.1
(58) Field of Classification Search .............. 455/101, 455/114.2, 273, 279.1, 226
See application file for complete search history.

(56) References Cited

U.S. PATENT DOCUMENTS

| 7,050,832 B2 * | 5/2006 | Kasapi ................ 455/562.1 |
| 2003/0068983 A1 | 4/2003 | Kim et al. |
| 2005/0286650 A1 | 12/2005 | Han et al. |

OTHER PUBLICATIONS

International Search Report issued on Oct. 25, 2007 in connection with PCT Application No. PCT/KR2007/003871.
Hongji Xu et al., "Joint Beamforming and Transmit Diversity for Wireless Communications," 2004 IEEE, pp. 195-199.
Robert H. Morelos-Zaragoza et al., "Combined Beamforming and Space-Time Block Coding with a Sparse Array Antenna," 2002 IEEE, pp. 432-434.

* cited by examiner

*Primary Examiner*—Sanh D Phu

(57) ABSTRACT

A base station for use in a wireless network communicating with a plurality of subscriber stations. The base station transmits in a downlink channel to a first subscriber station using a plurality of transmit antennas. The base station transmits to the first subscriber station using either a transmit diversity scheme or a beamforming scheme according to the amount of correlation between the transmit antennas observed at the first subscriber station. The base station also transmits to the first subscriber station using a cyclic delay diversity scheme having either zero delay or non-zero delay according to the amount of antenna/channel correlation observed at the first subscriber station.

21 Claims, 11 Drawing Sheets

FIG. 7A

ANTENNA ANT1: SB1 (1-64) | SB2 (65-128) | SB3 (129-192) | SB4 (193-256) | SB5 (257-320) | SB6 (321-384) | SB7 (385-448) | SB8 (449-512) — NO PHASE SHIFT

ANTENNA ANT2: SB1 (1-64) | SB2 (65-128) | SB3 (129-192) | SB4 (193-256) | SB5 (257-320) | SB6 (321-384) | SB7 (385-448) | SB8 (449-512) — PHASE SHIFT = $2\pi(\sin(\varphi)/\lambda)$

APPARATUS AND METHOD FOR TRANSMIT DIVERSITY AND BEAMFORMING IN A WIRELESS NETWORK

CROSS-REFERENCE TO RELATED APPLICATION(S) AND CLAIM OF PRIORITY

The present application is related to U.S. Provisional Patent No. 60/837,101, filed Aug. 11, 2006 and entitled "Transmit Diversity And Beamforming Scheme". U.S. Provisional Patent No. 60/837,101 is assigned to the assignee of this application and is hereby incorporated by reference into the present application as if fully set forth herein. The present application hereby claims priority under 35 U.S.C. §119(e) to U.S. Provisional Patent No. 60/837,101.

The present application is also related to U.S. patent application Ser. No. 11/327,799, filed Jan. 6, 2006 and entitled "Method And System For Introducing Frequency Selectivity Into Transmissions In An Orthogonal Frequency Division Multiplexing Network" and filed on Jan. 6, 2006. U.S. patent application Ser. No. 11/327,799 is assigned to the assignee of the present application and is hereby incorporated by reference into the present application as if fully set forth herein.

TECHNICAL FIELD OF THE INVENTION

The present application relates generally to wireless networks and, more specifically, to a transmit diversity and beamforming scheme for uses in a wireless communication system.

BACKGROUND OF THE INVENTION

A cellular network comprises a group of base stations that defines the radio coverage areas (or cells) of the network. Typically, a non-line-of-sight (NLOS) radio propagation path exists between a base station (BS) and a subscriber station (or mobile station, mobile terminal, etc.) due to natural and man-made objects situated between the base station and the subscriber station. As a result, the radio waves propagate via reflections, diffractions and scattering. The arriving waves at the subscriber station in the downlink (and at the base station in the uplink) experience constructive and destructive additions because of different phases of individual waves. This is due the fact that, at the high carrier frequencies typically used in cellular wireless networks, small changes in the differential propagation delays introduce large changes in the phases of the individual waves.

If the subscriber station (SS) is moving or there are changes in the scattering environment, then the spatial variations in the amplitude and phase of the composite received signal will manifest themselves as time variations known as Rayleigh fading or fast fading. The time-varying nature of the wireless channel requires very high signal-to-noise ratio (SNR) in order to provide the desired bit error or packet error reliability.

Conventional wireless networks use various diversity techniques to combat the effect of fast fading. Diversity techniques provide the receiver (e.g., subscriber station) with multiple faded replicas of the same information-bearing signal. Assuming independent fading on each of the antenna branches, the probability that the instantaneous signal-to-noise ratio (SNR) is below a certain threshold on each of the branches is approximately $p^L$, where p is the probability that the instantaneous SNR value is below the same threshold on each antenna branch.

Conventional diversity techniques generally fall into categories of space, angle, polarization, field, frequency, time and multipath diversity space diversity uses multiple transmit or receive antennas, where the spatial separations between the multiple antennas are chosen so that the diversity branches experience fading with little or no correlation. Transmit diversity uses multiple transmit antennas to provide the receiver with multiple uncorrelated replicas of the same signal.

Conventional transmit diversity schemes may be further divided into open-loop or closed-loop transmit diversity schemes. In an open-loop transmit diversity scheme, no feedback is required from the receiver. In one conventional closed-loop transmit diversity scheme, the receiver computes the phase and amplitude adjustment(s) that should be applied at the transmitter to maximize the received signal power at the receiver. In another conventional closed-loop transmit diversity scheme, referred to as selection transmit diversity (STD), the receiver provides feedback to the transmitter on antenna(s) to be used for transmission.

One well-known example of transmit diversity is the Alamouti 2×1 space-time diversity scheme. In this approach, during any symbol period, two data symbols are transmitted simultaneously from two transmit antennas. During a first symbol interval, the symbols transmitted from a first antenna (ANT1) and a second antenna (ANT2) are denoted as s(1) and s(2), respectively. During the next symbol period, the symbols transmitted from antennas ANT1 and ANT2 are −s*(2) and s*(1), respectively, where −s*(2) is the negative of the complex conjugate of s(2) and s*(1) is the complex conjugate of s(1). Signal processing in the subscriber station (SS) recovers the original symbols, s(1) and s(2). It is noted that the instantaneous channel gain estimates, g1 (for ANT1) and g2 (for ANT2), are required for processing at the SS receiver. Thus, separate pilot symbols are required for antennas ANT1 and ANT2 for channel gain estimation.

Another convention diversity technique commonly available in OFDM systems is frequency diversify. In an OFDM system exploiting frequency diversity, the subcarriers allocated for transmitting to a particular subscriber station may be uniformly distributed over the whole spectrum. For example, if an OFDM network allocates 64 out of N=512 subcarriers to a first subscriber station, the network may allocate every eighth subcarrier (SC) to the first subscriber station starting at the first subcarrier (i.e., SC1, SCS, SC17, . . . , SC505). Frequency diversity techniques are generally used for high mobility users and/or for delay-sensitive services.

Another conventional form of diversity is provided by Hybrid Acknowledgement Request (ARQ). Hybrid ARQ is a retransmission scheme whereby the transmitter sends the redundant coded information in small increments. In Hybrid ARQ, the transmitter first performs channel coding on an information packet P and then breaks the resulting coded bit stream into smaller subpackets (i.e., SP1, SP2, SP3, . . . ). The transmitter then transmits the first subpacket SP1 to the receiver.

The receiver initially tries to decode the entire information packet P using the first subpacket SP1. In case of unsuccessful decoding, the receiver stores subpacket SP1 and sends a NACK signal to the transmitter. After receiving the NACK signal, the transmitter transmits subpacket SP2. After receiving subpacket SP2, the receiver combines subpacket SP2 with the previously stored subpacket SP1 and tries to jointly decode the original information packet P. If decoding still fails, the receiver sends a NACK signal and the transmitter transmits additional subpackets (i.e., SP3, SP4, . . . ). At any point, if information packet P is successfully decoded, as indicated by a successful cyclic redundancy check (CRC), for example, the receiver sends an ACK signal to the transmitter.

Conventional networks also use beamforming techniques to transmit to multiple subscriber stations. The receiver in the subscriber station estimates the complex gains, $g_0, g_1, \ldots, g_P$, to be used from each transmit antenna of the base station. The base station uses these weights for transmission to the subscriber stations. However, the feedback information containing the complex gains represents a significant overhead and degrades the overall system spectral efficiency of the network.

U.S. patent application Ser. No. 11/327,799, entitled "Method And System For Introducing Frequency Selectivity Into Transmissions In An Orthogonal Frequency Division Multiplexing Network" and filed on Jan. 6, 2006, discloses a method and apparatus for artificially providing diversity in an orthogonal frequency division multiplexing (OFDM) wireless communication system. U.S. patent application Ser. No. 11/327,799 was incorporate by reference above. In the method and apparatus disclosed in application Ser. No. 11/327,799, diversity is artificially provided by generating a plurality of delayed symbols from a first symbol and then transmitting each of the delayed symbols from a different antenna. Each of the delayed symbols may also be scaled by a different gain factor.

In an adaptive cyclic delay diversity scheme, the delay values can be different for different subscriber stations depending upon the subscriber station's channel profile, velocity, and other factors. For example, a large delay value may be chosen for a high-speed subscriber stations requiring frequency-diversity benefit while a small delay value may be adopted for a low-speed subscriber stations that may potentially benefit from frequency-selective multi-user scheduling. Moreover, if the channel is already sufficiently frequency selective, a small delay value may be sufficient even for frequency-diversity mode transmission for high Doppler subscriber stations.

In an exemplary base station that implements adaptive cyclic delay diversity (ACDD) transmitter using (P+1) transmit antennas, the cyclic delay values on antenna ANT1 through antenna ANTP for each subscriber station m may be designated $D_{m1}, D_{m2}$, and $D_{mP}$, respectively. A non-delayed signal ($D_{m0}=0$) is transmitted from the first antenna, designated antenna ANT0. In a more general form, different complex gains, $g_0, g_1, \ldots, g_P$, may also be applied to signals transmitted from different transmit antennas. The transmission of the same OFDM symbol from different antennas artificially provides frequency-selective fading. The frequency-selectivity may then be exploited by either using frequency-selective multi-user scheduling for low-speed to medium-speed subscriber stations or frequency-diversity for high-speed subscriber stations.

By using adaptive cyclic delay diversity (ACDD), the reception in the subscriber station receiver resembles multipath transmission from a single transmit antenna. The composite channel response, $H_{mc}(k)$, on subcarrier k can be written as:

$$H_{mc}(k) = H_{m0}(k) + H_{m1}(k) \cdot e^{-j2\pi k D_{m1}/N} + \ldots + H_{mP}(k) \cdot e^{-j2\pi k D_{mP}/N} \quad [\text{Eqn. 1}]$$

where $H_{mn}(k)$ is the channel response for subscriber station m on antenna n, and k is the subcarrier index. In this case, it is assumed that the complex antenna gains, $g_0, g_1, \ldots g_P$, are all unity.

Alternatively, the adaptive cyclic delay diversity operation may be performed directly in the frequency domain. A weight of $$e^{-j2\pi k D_{mp}/N} \quad [\text{Eqn. 2}]$$

may be applied to subcarrier k transmitted from antenna p to subscriber station m, where $D_{mP}$ is the cyclic delay value on antennas p for subscriber station m.

In one example of resource portioning in an OFDM network, a total of 512 OFDM subcarriers may be divided into eight (8) groups (or subbands) of 64 subcarriers each. A given subscriber station may be allocated one or more of these subbands. In an exemplary embodiment of adaptive cyclic delay diversity, the 512 subcarriers of a first OFDM symbol may be transmitted from a first antenna with no phase shift (i.e., no delay), while the 512 subcarriers of the first OFDM symbol may be transmitted from a second antenna with a delay of one sample period. A one sample delay results in a weight of $$e^{-j2\pi k/N} \quad [\text{Eqn. 3}]$$

applied to the kth subcarrier. A phase shift of $2\pi/N$ is applied to the first subcarrier and phase shift of $2\pi$ is applied to the last subcarrier, respectively, where N=512. Therefore, the phase shift applied to each subcarrier increases linearly with the subcarrier index (i.e., from subcarrier 1 to subcarrier 512).

It is noted that a complete cycle of phase shifts from $2\pi/N$ to $2\pi$ happens over the whole bandwidth. The phase shift increments by $2\pi/N$ from one subcarrier to the next. The phase shift applied to the subbands transmitted from the second antenna happens in increments of $2\pi M/N$, where M is the number of subcarriers in a subband. In case of a cyclic delay of D samples, D cycles of phase shift from $2\pi/N$ to $2\pi$ happen over the whole bandwidth. The benefits provided by cyclic delay diversity may be achieved by applying a different random phase shift to different subcarriers. The receiver obtains the benefits of frequency-diversity because different subcarriers combine constructively and destructively, depending upon the random phase shift applied.

Cyclic delay diversity as well as other forms of transmit diversity schemes, such as space-time diversity (or STD) suffer from performance loss in the case of correlated antennas or correlated channels because there is little or no diversity present in the channel that can be exploited. Additionally, the frequency-selectivity introduced due to delayed transmissions from multiple antennas in case of adaptive cyclic delay diversity (ACDD) may result in loss in performance relative to transmission from a single antenna with no transmit diversity. It is noted that ACDD actually translates spatial or antenna diversity into frequency-diversity. When there is no spatial or antenna diversity present due to correlated antennas, ACDD cannot create any frequency-diversity. However, the delayed transmissions from multiple antennas create frequency-selectivity without frequency diversity, which results in performance loss. The antenna correlations may result from closely spaced antennas, lack of scattering, or both.

Therefore, there is a need for improved wireless networks that implement adaptive cyclic delay diversity. In particular, there is a need for wireless networks that implement adaptive cyclic delay diversity in correlated antenna and correlated channels conditions without performance loss.

SUMMARY OF THE INVENTION

To address the above-discussed deficiencies of the prior art, it is a primary object to provide, for use in a wireless network capable of communicating with a plurality of subscriber stations, a base station capable of transmitting in a downlink channel to a first one of the plurality of subscriber stations using a plurality of transmit antennas. In an advantageous embodiment, the base station transmits to the first subscriber station using a selected one of a transmit diversity scheme and a beamforming scheme according to an amount of correlation observed at the first subscriber station in downlink signals transmitted by the plurality of transmit antennas. The base station transmits to the first subscriber station using the transmit diversity scheme if the amount of correlation observed at the first subscriber station is relatively low and transmits to the first subscriber station using the beamforming scheme if the amount of correlation observed at the first subscriber station is relatively high.

In an advantageous embodiment, the base station transmits to the first subscriber station using a selected one of a first cyclic delay diversity scheme having a non-zero delay and a second cyclic delay diversity scheme having a zero delay according to an amount of correlation observed at the first subscriber station in downlink signals transmitted by the plurality of transmit antennas. The base station is further capable of transmitting to the first subscriber station from a first antenna and a second antenna, wherein the signal transmitted from the second antenna is phase-shifted relative to the signal transmitted from the first antenna.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7A illustrates Zero-CDD using a phase shift applied to subcarriers on a second antenna relative to a first antenna according to one embodiment of the disclosure;

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The present disclosure discloses a new technique wherein the decision between transmit diversity schemes and beamforming schemes is made based on the antenna correlations. When the antennas are uncorrelated, a transmit diversity scheme is selected to exploit the channel diversity. On the other hand, when the channel or antennas are correlated, a beamforming approach is selected to exploit the beamforming gains.

In an advantageous embodiment, the cyclic delays in adaptive cyclic delay diversity (ACDD) are adapted based on channel and antenna correlations. When the antennas are uncorrelated, the ACDD operation delays transmissions from multiple transmit antennas to exploit the diversity. However, when the antennas are correlated, ACDD operation introduces no delays when transmitting the same information from multiple transmit antennas. ACDD operation provides additional beamforming gains when the same information is transmitted from multiple antennas in the case of correlated transmit antennas.

Figure 1:
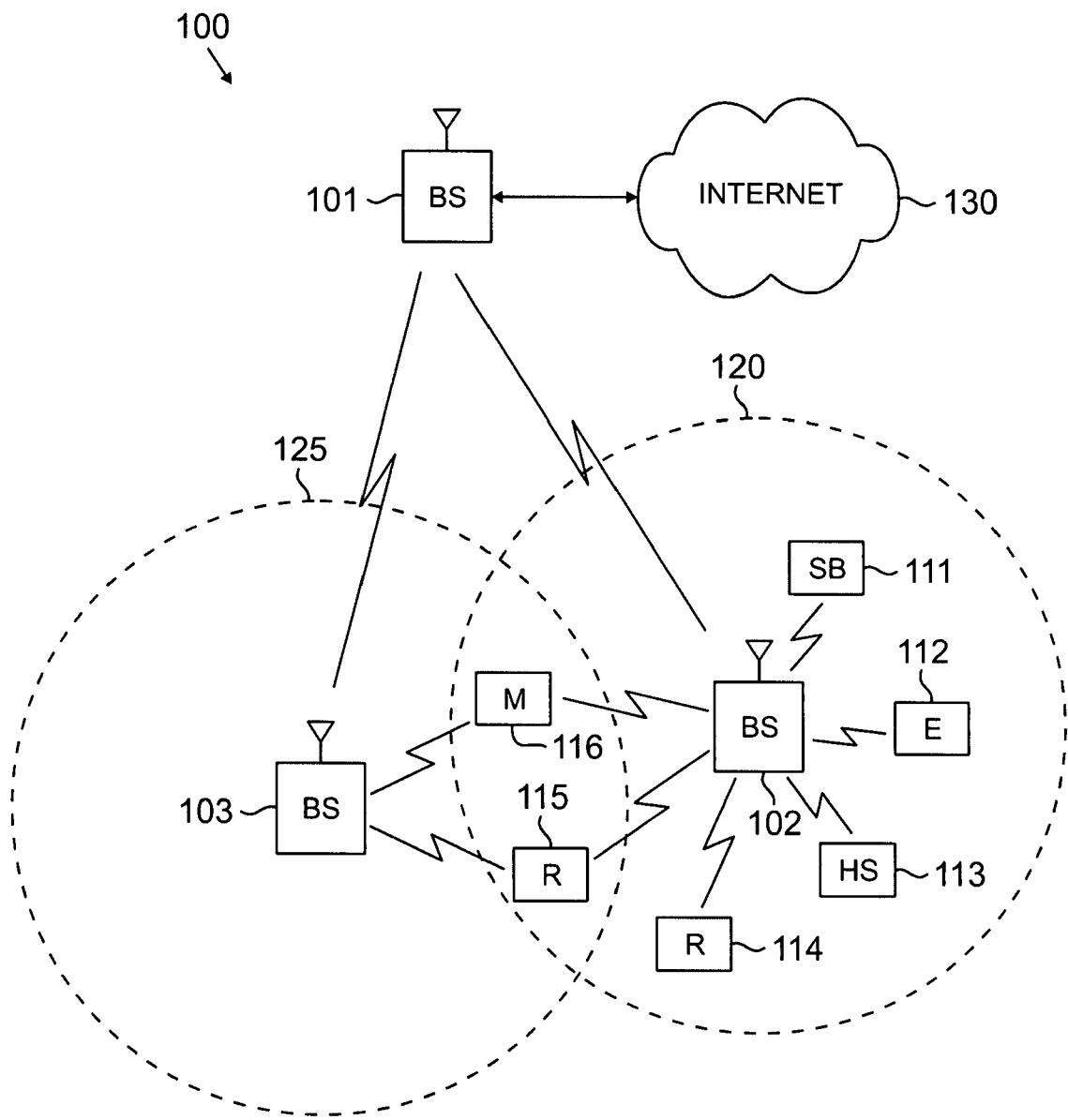
FIG. 1 illustrates an exemplary OFDMA wireless network that selects between a transmit diversity scheme and a beamforming scheme based on the antenna correlations according to the principles of the present disclosure.

FIG. 1 illustrates exemplary orthogonal frequency division multiple access (OFDMA) wireless network 100, which selects between a transmit diversity scheme and a beamforming scheme based on the antenna correlations according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
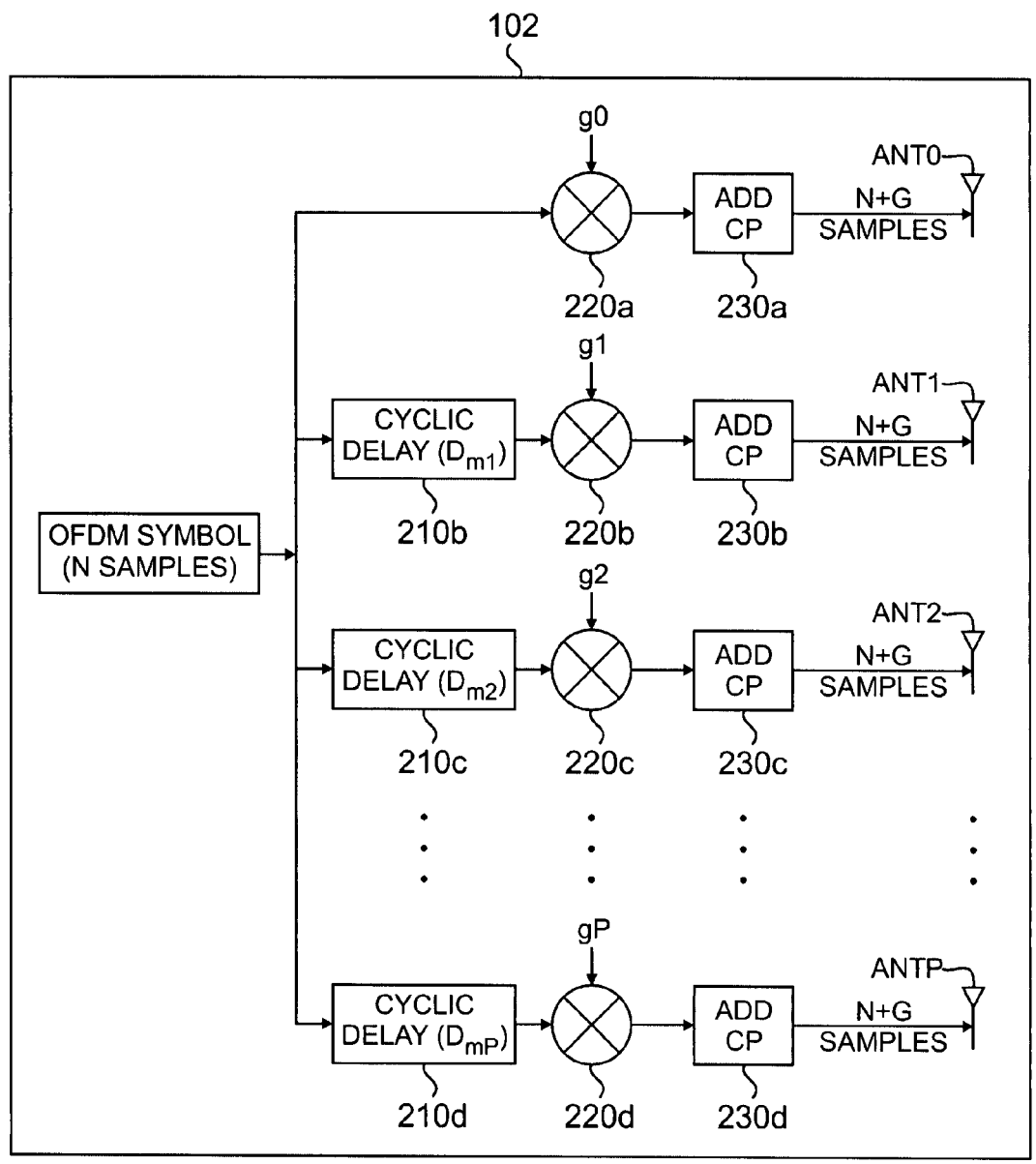
FIG. 2 illustrates selected portions of an exemplary base station according to one embodiment of the disclosure.

FIG. 2 illustrates selected portions of exemplary base station (BS) 102 according to one embodiment of the present disclosure. BS 102 comprises P+1 transmit antennas, labeled ANT0 through ANTP. BS 102 also comprises P cyclic delay blocks 210, including exemplary cyclic delay blocks 210b, 210c, and 210d, P+1 gain control blocks 220, including exemplary gain control block 220a, 220b, 220c and 220d, and P+1 add cyclic prefix (CP) blocks 230, including exemplary cyclic prefix (CP) blocks 230a, 230b, 230c and 230d.

In a first transmit path, an undelayed copy of a first N-sample OFDM symbol is amplified by complex gain factor g0 by gain control block 220a. Add CP block 230a receives the scaled output of gain control block 220a, copies the last G samples of the N-sample block, and appends the last G samples to the start of the N-sample block, thereby generating N+G samples that are sent to antenna ANT0 (other parts of the transit path, such as an IFFT block are omitted for clarity).

The OFDM symbol is also applied to the remaining P transmit paths in BS 102, except that a delay is applied to the other P copies of the OFDM symbol. By way of example, cyclic delay block 210b receives the OFDM symbol and delays the sample by a cyclic delay value $D_{m1}$. Gain control block 220b amplifies the delayed OFDM symbol by complex gain factor g1. Add CP block 230b receives the delayed, scaled output of gain control block 220b, copies the last G samples of the N-sample block, and appends the last G samples to the start of the N-sample block, thereby generating N+G samples that are sent to antenna ANT1. Thus, P+1 copies of the OFDM symbol are transmitted from the P+1 antennas of BS 102.

Figure 3:
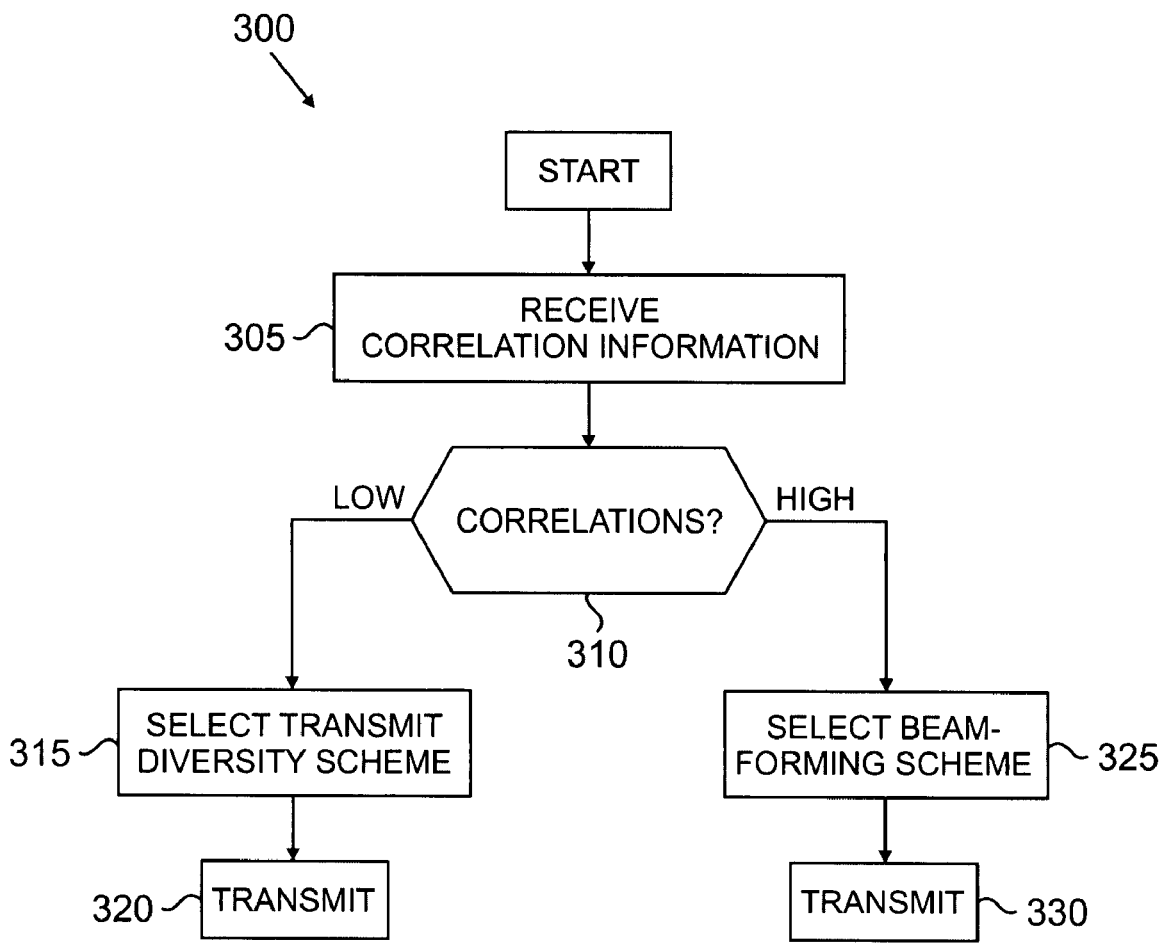
FIG. 3 is a flow diagram illustrating the selection between transmit diversity and beamforming according to one embodiment of the disclosure.

FIG. 3 depicts flow diagram 300, which illustrates the selection between transmit diversity and beamforming based on antenna correlation according to one embodiment of the present disclosure. Initially, BS 102 receives feedback message from a subscriber station that contains antenna (or channel) correlation information (process step 305). Next, ES 102 determines from the feedback whether there is a high amount (or degree) of correlation or a low amount (or degree) of antenna/channel correlation (process step 310). By way of example, BS 102 may make this determination by comparing the measured level of correlation to a known threshold value. If there is a low degree of correlation for the subscriber station, ES 102 selects a transmit diversity scheme for downlink transmission to the subscriber station (process step 315). BS 102 then transmits according to the selected scheme (process step 320). If there is a high degree of correlation for the subscriber station, ES 102 selects a beamforming scheme for downlink transmission to the subscriber station (process step 325). BS 102 then transmits according to the selected scheme (process step 330).

Figure 4:
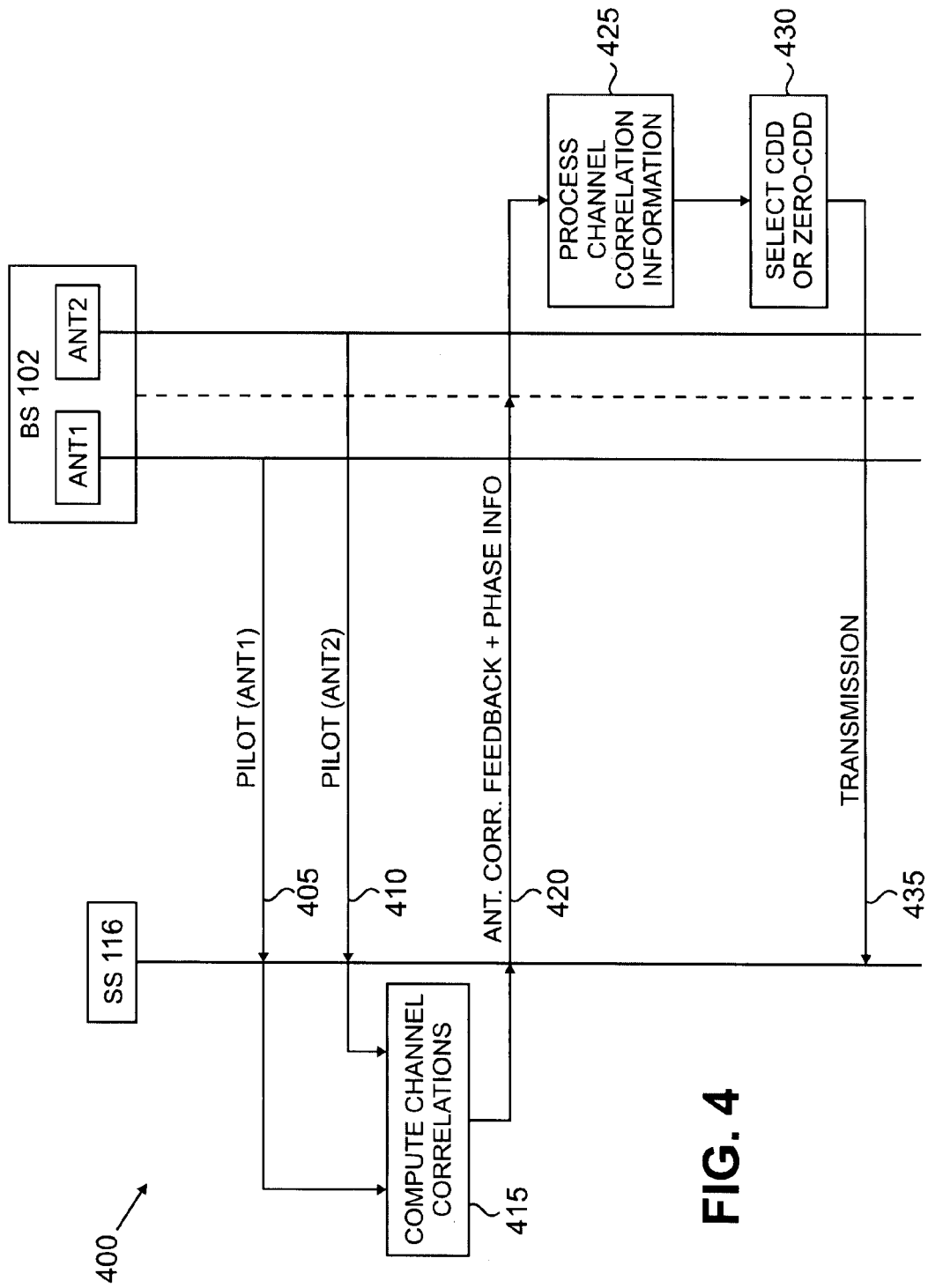
FIG. 4 is a flow diagram illustrating the selection between cyclic delay diversity (CDD) and zero cyclic delay diversity (zero-CDD) according to one embodiment of the disclosure.

In addition to selecting between transmit diversity and beamforming based on channel/antenna correlation, the present disclosure provides that wireless network 100 may select between zero delay and non-zero delay in cyclic delay diversity mode based on channel/antenna correlation FIG. 4 depicts flow diagram 400, which illustrates the selection between non-zero cyclic delay diversity (CDD) and zero cyclic delay diversity (zero-CDD) in wireless network 100 according to one embodiment of the present disclosure. Initially, BS 102 transmits a first pilot signal (or reference signal) from antenna ANT1 (process step 405) and transmit a second pilot signal (or reference signal) from antenna ANT2 (process step 410) to subscriber station (SS) 116. Next, SS 116 computes the channel correlations on the pilot or reference signals (process step 415) and reports back the antenna correlation and phase information to BS 102 (process step 420). BS 102 then processes the channel correlation information (process step 425) and decides, based on the channel correlations, between 1) cyclic delay diversity (CDD) mode with a delay of one or more samples; and 2) zero cyclic delay diversity (zero-CDD) (process step 430). Finally, BS 102 then transmits to SS 102 in the downlink according to the selected mode (process step 435).

Figure 5:
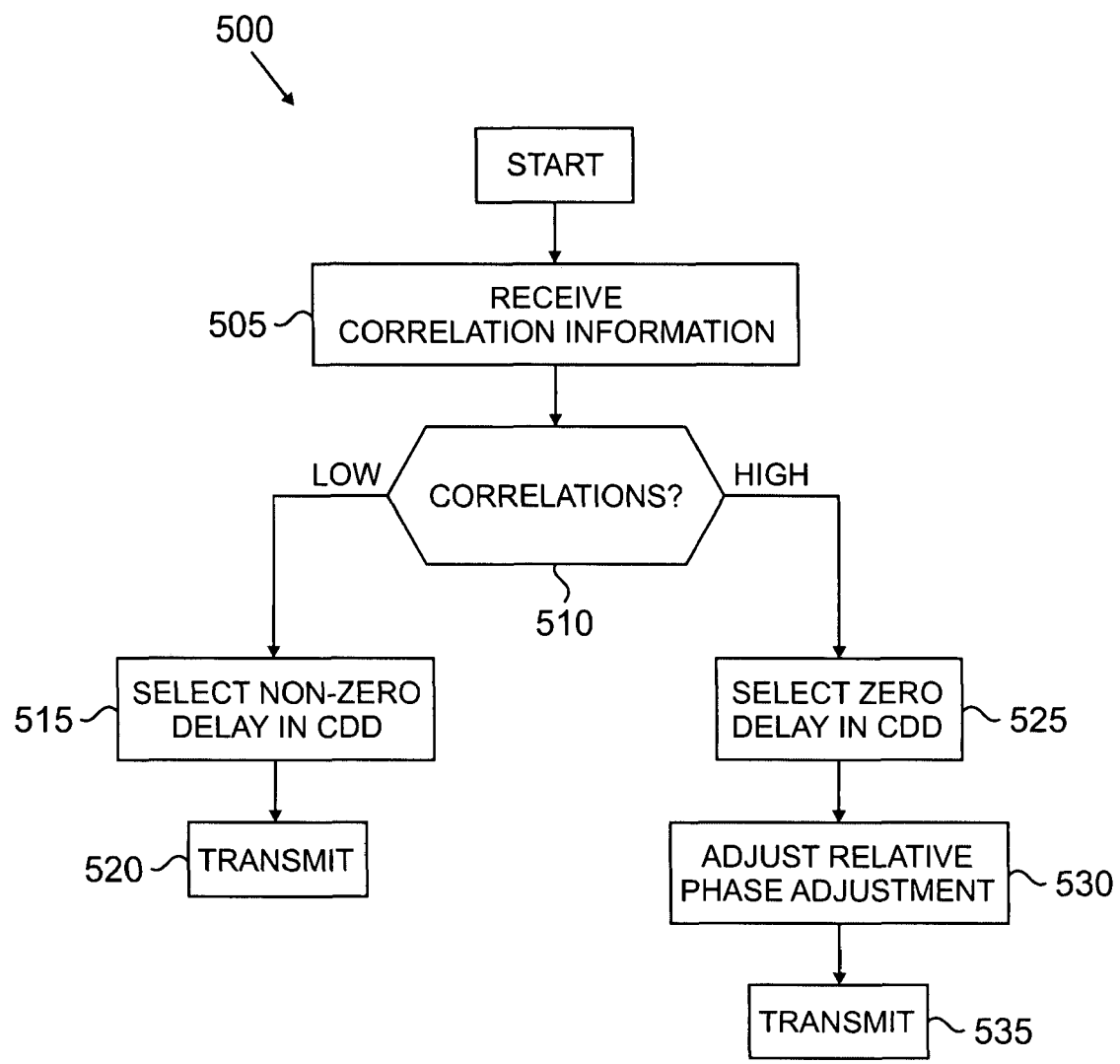
FIG. 5 is a flow diagram illustrating the selection in a base station between CDD and Zero-CDD according to one embodiment of the present disclosure.

FIG. 5 depicts flow diagram 500, which illustrates the selection between non-zero cyclic delay diversity (CDD) and zero cyclic delay diversity (zero-CDD) in BS 102 according to one embodiment of the present disclosure. Initially, BS 102 receives feedback message from SS 116 that contains antenna (or channel) correlation information (process step 505). Next, BS 102 determines from the feedback message whether there is a high degree of correlation or a low degree of correlation (process step 510). Again, by way of example, BS 102 may make this determination by comparing the amount of correlation observed by SS 116 to a known threshold value. If there is a low amount (or degree) of correlation for the subscriber station, BS 102 selects a non-zero delay value in cyclic delay diversity (CDD) mode scheme for downlink transmission to SS 116 (process step 515). BS 102 then transmits according to the selected scheme (process step 520).

If there is a high amount (or degree) of correlation for SS 116, BS 102 selects a zero-delay value in zero-CDD mode for downlink transmission to SS 116 (process step 525). BS 102 applies a fixed phase shift to the signals transmitted from the second antenna (ANT2) to compensate for the phase difference between signals transmitted to SS 116 at an angle, ϕ, from bore sight of the transmitter in BS 102 (process step 530). BS 102 then transmits according to the selected scheme (process step 535).

Figure 6:
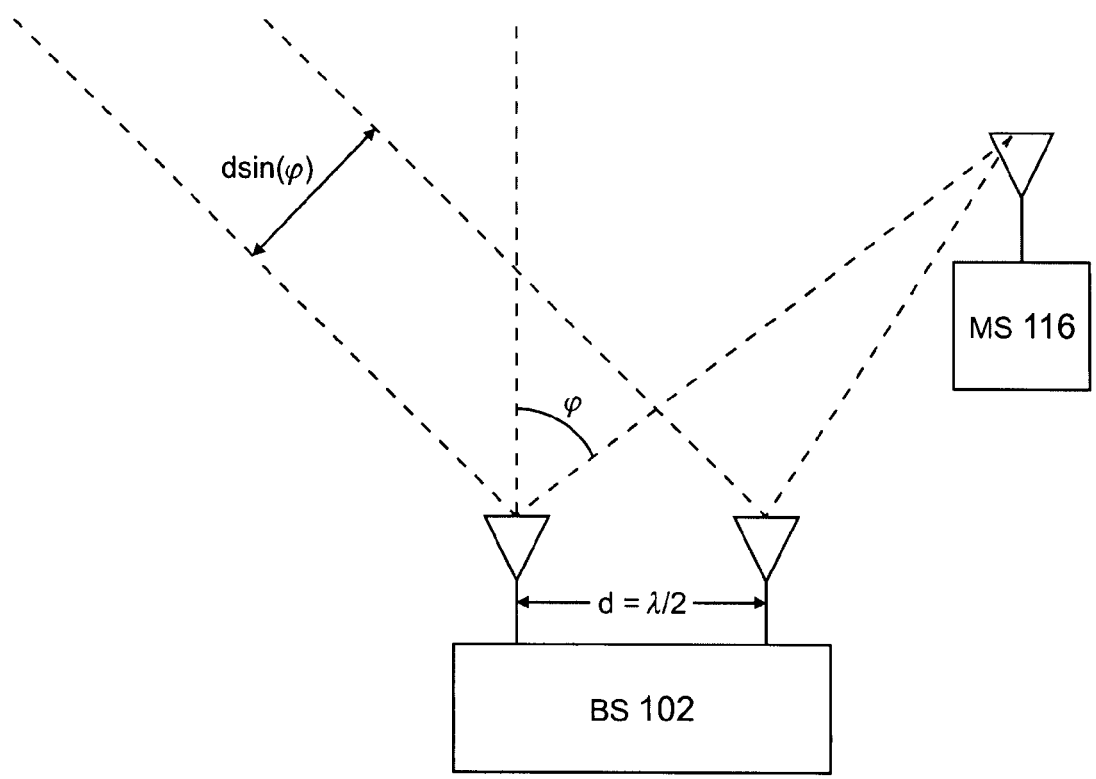
FIG. 6 illustrates transmission from a base station to a subscriber station using a phase adjustment to co-phase the signals transmitted from two antennas according to one embodiment of the disclosure.

FIG. 6 illustrates transmission from base station 102 to subscriber station 116 using a phase adjustment to co-phase the signals transmitted from antennas ANT1 and ANT2 according to one embodiment of the disclosure. The phase adjustment depends upon the Angle-of-Arrival (AoA) or Angle-of-Departure (AoD), φ, of the transmitted signals as shown in FIG. 6. When φ=0, no phase adjustment is needed because the signals arrive in co-phase at SS 116. In general, a phase shift of $$\theta = 2\pi \cdot \left( \frac{d \cdot \sin(\varphi)}{\lambda} \right) \qquad [\text{Eqn. 4}]$$

is applied for signals transmitted from antenna ANT2 relative to signals transmitted from antenna ANT1.

FIG. 7A illustrates zero cyclic delay diversity (Zero-CDD) using a phase adjustment applied to subcarriers on antenna ANT2 relative to antenna ANT1 according to one embodiment of the disclosure. In FIG. 7A, wireless network 100 transmits in OFDM using, by way of example, 512 subcarriers that are divided into 8 subbands (SB1 through SB8), where each subband contains 64 subcarriers.

Figure 7B:
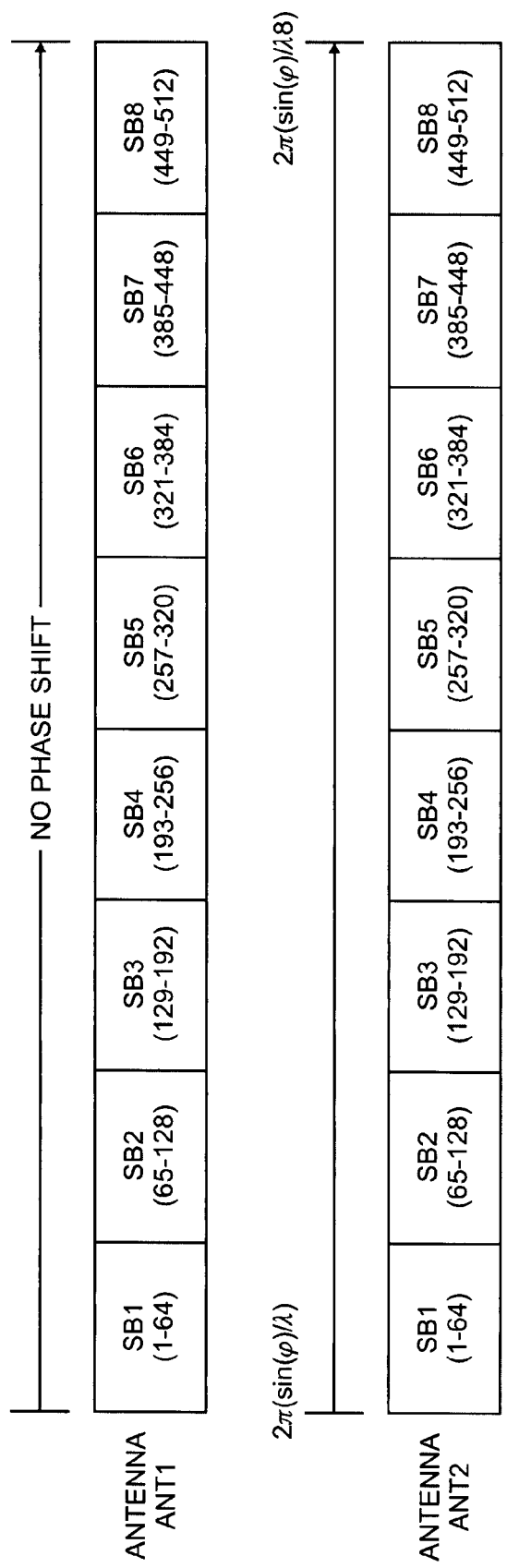
FIG. 7B illustrates Zero-CDD using a phase adjustment to co-phase the transmitted signals from each of the subbands and each of the antennas according to one embodiment of the disclosure.

FIG. 7B illustrates zero cyclic delay diversity (Zero-CDD) using a phase adjustment to co-phase the transmitted signals from each of the subbands and each of the antennas according to one embodiment of the disclosure. It is noted that the phase adjustment is a function of frequency (i.e., wavelength) and therefore different subcarriers or different subbands require different phase adjustments to co-phase the transmitted signals. In general, a phase shift that is inversely proportional to the subband frequency is applied, with $$\theta_i = 2\pi \cdot \left( \frac{d \cdot \sin(\varphi)}{\lambda_i} \right) \qquad [\text{Eqn. 5}]$$

phase shift applied to the ith subband.

Figure 8:
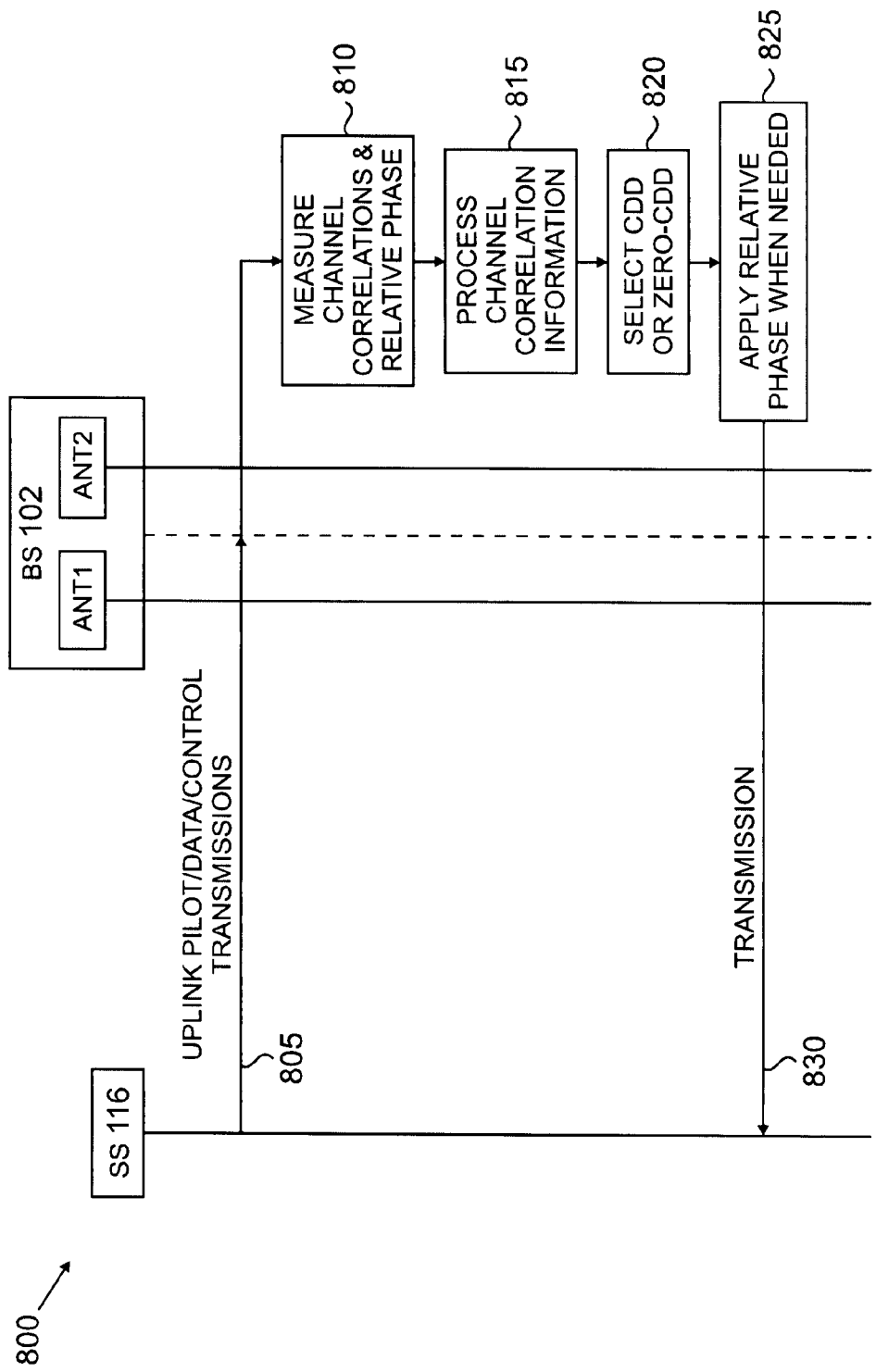
FIG. 8 is a flow diagram 800 illustrating the selection between CDD and Zero-CDD based on channel correlations measured from uplink transmissions in one embodiment of the disclosure.

FIG. 8 depicts flow diagram 800, which illustrates the selection in BS 102 between non-zero cyclic delay diversity (CDD) and zero cyclic delay diversity (zero-CDD) based on the channel correlations measured from uplink transmissions according to one embodiment of the disclosure. Initially, BS 102 receives signals transmitted in the uplink by SS 116, including, for example, data signals, pilot signals, and control signals (process step 805). BS 102 then measures the channel correlations and relative phases of the received signals (process step 810). BS 102 processes the channel correlation information (process step 815) and selects either cyclic delay diversity (CDD) with a delay of one or more samples or zero cyclic delay diversity (zero-CDD) with no delay based on the channel correlations measured from uplink transmissions (process step 820). BS 102 may also apply a phase shift on antenna ANT2 relative to antenna ANT1 according to the relative phase information measured from uplink transmissions (process step 825). Finally, BS 102 transmits downlink signals to SS 116 according to the selected mode (process step 830).

Figure 9:
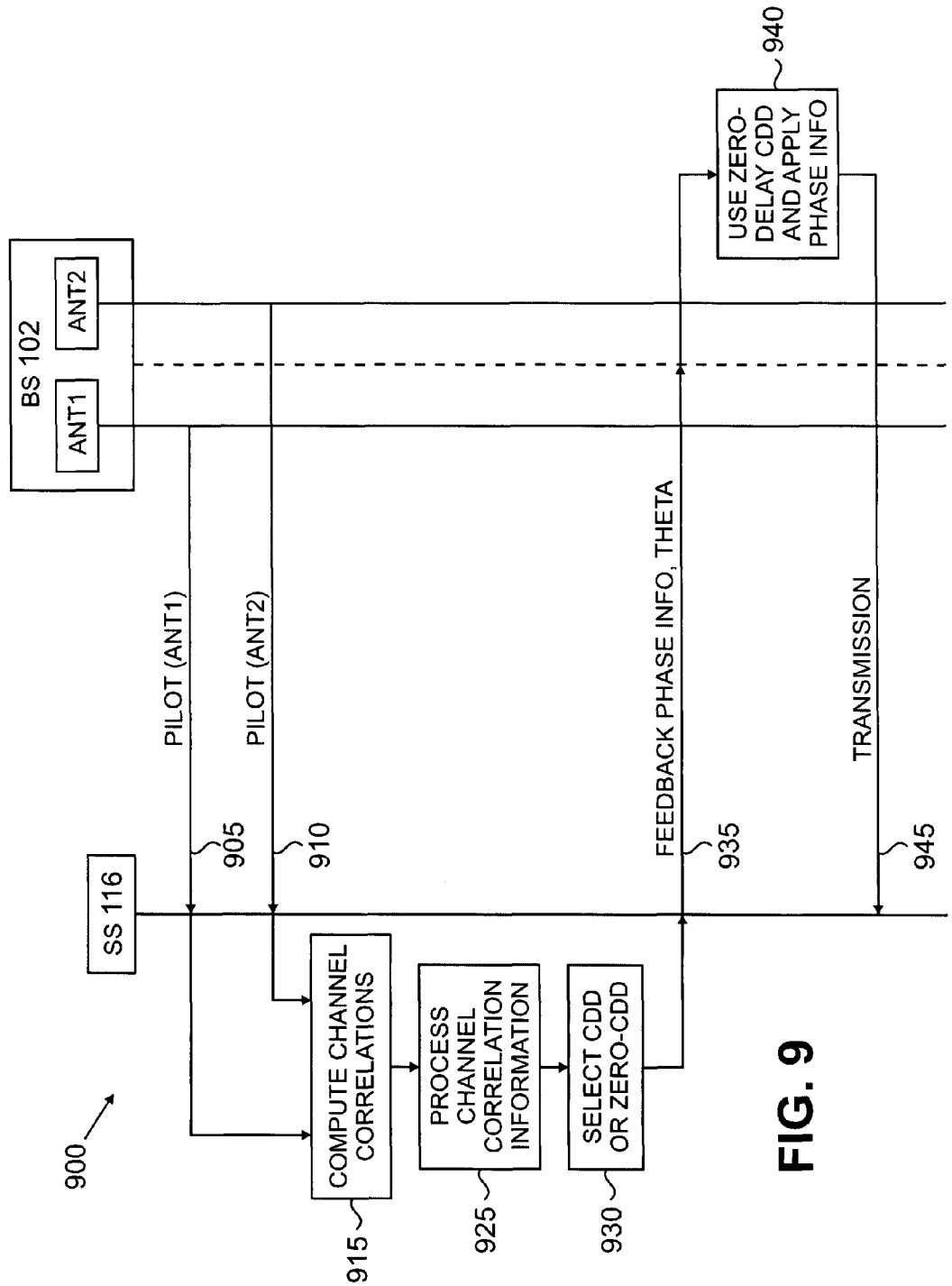
FIG. 9 is a flow diagram illustrating the selection between CDD and Zero-CDD in a subscriber station based on the channel correlations measured from downlink transmissions according to one embodiment of the disclosure.

FIG. 9 depicts flow diagram 900, which illustrates the selection between non-zero cyclic delay diversity (CDD) and zero cyclic delay diversity (zero-CDD) in SS 116 based on the channel correlations measured from downlink transmissions according to one embodiment of the disclosure. Initially, BS 102 transmits a first pilot signal (or reference signal) from antenna ANT1 (process step 905) and transmit a second pilot signal (or reference signal) from antenna ANT2 (process step 810) to subscriber station (SS) 116. SS 116 computes or measures the channel correlations on the pilot or reference signals (process step 915) and then processes the channel correlation information (process step 925) to determine the amount of correlation. Based on the amount of correlation, SS 116 selects either non-zero CDD or zero-CDD for downlink transmissions from BS 102 (process step 930).

Next, SS 116 transmits a message back to BS 102 that indicates whether non-zero CDD or zero-CDD has been selected and also feedbacks information on the relative phase to be applied to transmissions from transmit antenna ANT2 relative to antenna ANT1 (process step 935). BS 102 then selects the mode indicated by SS 116 and applies the indicated phase shift on antenna ANT2 relative to antenna ANT1 (process step 940). BS 102 then transmits in the downlink (process step 945).

Figure 10:
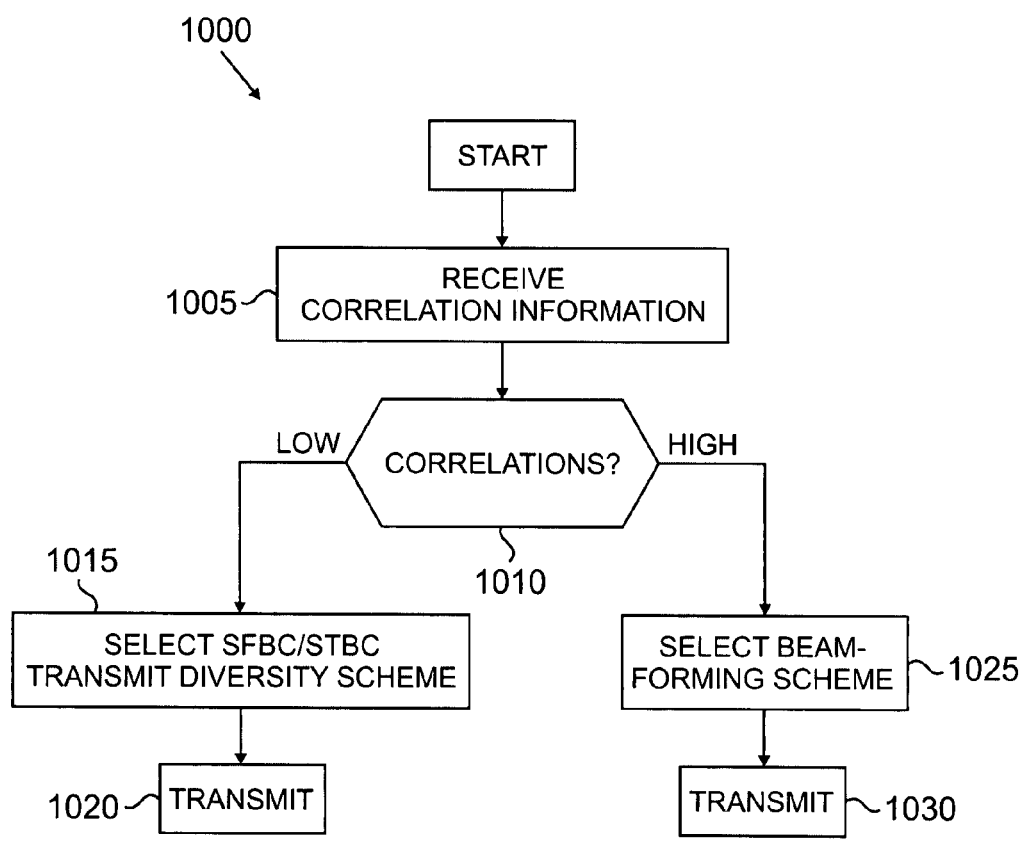
FIG. 10 is a flow diagram illustrating selection between block codes-based transmit diversity and beamforming according to one embodiment of the present disclosure.

FIG. 10 depicts flow diagram 1000, which illustrates the selection between block codes-based transmit diversity and beamforming according to one embodiment of the disclosure. Initially, BS 102 receives feedback message from a subscriber station that contains antenna (or channel) correlation information (process step 1005). Next, BS 102 determines from the feedback information whether there is a high degree of correlation or a low degree of antenna/channel correlation (process step 1010). If there is a low degree of correlation for the subscriber station, BS 102 selects a block code-based transmit diversity scheme, such as SFBC or STBC for downlink transmission to the subscriber station (process step 1015). BS 102 then transmits according to the selected scheme (process step 1020). If there is a high degree of correlation for the subscriber station, BS 102 selects beamforming for downlink transmission to the subscriber station (process step 1025). BS 102 then transmits according to the selected scheme (process step 1030).

In an advantageous embodiment, BS 102 may switch between zero-CDD and CDD (i.e., non-zero CDD) happens based on the hybrid ARQ ACK/NACK feedback. For example, a first hybrid ARQ transmission may be performed using zero-CDD mode. However, if an error occurs, as indicated by a negative acknowledgment (NACK) message from SS 116, BS 102 sends the subsequent hybrid ARQ transmissions using a non-Zero CDD mode.

Many of the details of the disclosure have been explained in an embodiment using two transmit antennas. However, the principles of the current invention are easily applied to the case of more than two transmit antennas in a straight forward manner.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network capable of communicating with a plurality of subscriber stations, a base station capable of transmitting in a downlink channel to a first one of the plurality of subscriber stations using a plurality of transmit antennas, wherein the base station transmits to the first subscriber station using a selected one of a transmit diversity scheme and a beamforming scheme according to an amount of correlation observed at the first subscriber station in downlink signals transmitted by the plurality of transmit antennas.

2. The base station as set forth in claim 1, wherein the base station transmits to the first subscriber station using the transmit diversity scheme if the amount of correlation observed at the first subscriber station is relatively low.

3. The base station as set forth in claim 1, wherein the base station transmits to the first subscriber station using the beamforming scheme if the amount of correlation observed at the first subscriber station is relatively high.

4. The base station as set forth in claim 1, wherein the base station transmits to the first subscriber station using a selected one of a first cyclic delay diversity scheme having a non-zero delay and a second cyclic delay diversity scheme having a zero delay according to an amount of correlation observed at the first subscriber station in downlink signals transmitted by the plurality of transmit antennas.

5. The base station as set forth in claim 4, wherein the base station transmits to the first subscriber station using the first cyclic delay diversity scheme having a non-zero delay if the amount of correlation observed at the first subscriber station is relatively low.

6. The base station as set forth in claim 4, wherein the base station transmits to the first subscriber station using the second cyclic delay diversity scheme having a zero delay if the amount of correlation observed at the first subscriber station is relatively high.

7. The base station as set forth in claim 6, wherein the base station transmits to the first subscriber station from a first antenna and a second antenna, wherein the signal transmitted from the second antenna is phase-shifted relative to the signal transmitted from the first antenna.

8. A wireless network comprising a plurality of base stations capable of communicating with a plurality of subscriber stations, wherein a first one of the plurality of base stations transmits in a downlink channel to a first one of the plurality of subscriber stations using a plurality of transmit antennas and wherein the first base station transmits to the first subscriber station using a selected one of a transmit diversity scheme and a beamforming scheme according to an amount of correlation observed at the first subscriber station in downlink signals transmitted by the plurality of transmit antennas.

9. The wireless network as set forth in claim 8, wherein the first base station transmits to the first subscriber station using the transmit diversity scheme if the amount of correlation observed at the first subscriber station is relatively low.

10. The wireless network as set forth in claim 8, wherein the first base station transmits to the first subscriber station using the beamforming scheme if the amount of correlation observed at the first subscriber station is relatively high.

11. The wireless network as set forth in claim 8, wherein the first base station transmits to the first subscriber station using a selected one of a first cyclic delay diversity scheme having a non-zero delay and a second cyclic delay diversity scheme having a zero delay according to an amount of correlation observed at the first subscriber station in downlink signals transmitted by the plurality of transmit antennas.

12. The wireless network as set forth in claim 11, wherein the first base station transmits to the first subscriber station using the first cyclic delay diversity scheme having a non-zero delay if the amount of correlation observed at the first subscriber station is relatively low.

13. The wireless network as set forth in claim 12, wherein the first base station transmits to the first subscriber station using the second cyclic delay diversity scheme having a zero delay if the amount of correlation observed at the first subscriber station is relatively high.

14. The wireless network as set forth in claim 13, wherein the first base station transmits to the first subscriber station from a first antenna and a second antenna, wherein the signal transmitted from the second antenna is phase-shifted relative to the signal transmitted from the first antenna.

15. For use in a wireless network capable of communicating with a plurality of subscriber stations, a method of transmitting in a downlink channel from a base station to a first one of the plurality of subscriber stations using a plurality of transmit antennas, the method comprising:
  receiving a determination regarding an amount of correlation observed at the first subscriber station in downlink signals transmitted by the plurality of transmit antennas;
  selecting one of a transmit diversity scheme and a beamforming scheme to transmit to the first subscriber station in the downlink channel; and
  transmitting to the first subscriber station using the selected one of the transmit diversity scheme and the beamforming scheme.

16. The method as set forth in claim 15, wherein the step of selecting selects the transmit diversity scheme if the amount of correlation observed at the first subscriber station is relatively low.

17. The method as set forth in claim 15, wherein the step of selecting selects the beamforming scheme if the amount of correlation observed at the first subscriber station is relatively high.

18. The method as set forth in claim 15, wherein the method further comprises the steps of:
  selecting one of a first cyclic delay diversity scheme having a non-zero delay and a second cyclic delay diversity scheme having a zero delay to transmit to the first subscriber station in the downlink channel; and
  transmitting to the first subscriber station using the selected one of the first cyclic delay diversity scheme having a non-zero delay and the second cyclic delay diversity scheme having a zero delay.

19. The method as set forth in claim 18, wherein the step of selecting selects the first cyclic delay diversity scheme having a non-zero delay if the amount of correlation observed at the first subscriber station is relatively low.

20. The method as set forth in claim 19, wherein the step of selecting selects the second cyclic delay diversity scheme having a zero delay if the amount of correlation observed at the first subscriber station is relatively high.

21. The method as set forth in claim 20, further comprising the step of transmitting to the first subscriber station using the second cyclic delay diversity scheme having a zero delay from a first antenna and a second antenna, wherein the signal transmitted from the second antenna is phase-shifted relative to the signal transmitted from the first antenna.

* * * * *